United States Patent
Antonellis et al.

[11] Patent Number: 5,874,892
[45] Date of Patent: Feb. 23, 1999

[54] VEHICLE WARNING SYSTEM

[76] Inventors: Domenico Antonellis, 10 Bruno La., Dix Hills, N.Y. 11746; George Valentino, 2667 Rockaway Ave., Oceanside, N.Y. 11572

[21] Appl. No.: 12,659

[22] Filed: Jan. 23, 1998

[51] Int. Cl.⁶ ..................................................... B60Q 9/00
[52] U.S. Cl. ...................... 340/438; 340/575; 340/576; 340/902; 180/271; 180/272
[58] Field of Search ..................... 340/438, 479, 340/576, 467, 465, 439, 575, 904, 901, 902; 307/10.1; 180/271, 272

[56] References Cited

U.S. PATENT DOCUMENTS

| | | | |
|---|---|---|---|
| D. 313,661 | 1/1991 | Kang | D26/31 |
| 4,214,381 | 7/1980 | Clark et al. | 434/67 |
| 4,485,373 | 11/1984 | Hershberger | 340/576 |
| 4,540,979 | 9/1985 | Gerger et al. | 340/576 |
| 4,663,609 | 5/1987 | Rosario | 340/72 |
| 4,706,072 | 11/1987 | Ikeyama | 340/576 |
| 4,843,368 | 6/1989 | Poulos | 340/464 |
| 5,059,947 | 10/1991 | Chen | 340/467 |
| 5,126,735 | 6/1992 | Trevijano | 340/902 |
| 5,404,130 | 4/1995 | Lee et al. | 340/479 |
| 5,442,333 | 8/1995 | Bailey | 340/467 |
| 5,463,258 | 10/1995 | Filion et al. | 307/10.1 |
| 5,585,785 | 12/1996 | Gwin et al. | 340/575 |

*Primary Examiner*—Jeffery A. Hofsass
*Assistant Examiner*—Davetta Woods
*Attorney, Agent, or Firm*—Goldstein & Canino

[57] ABSTRACT

A vehicle warning system for vehicles comprising a pressure activated switch disposed within the steering wheel for activating a transmitter when more than normal pressure is applied to the steering wheel. The vehicle warning system further comprises a warning unit which contains a receiver, a sound generator, and a warning lights. When a driver is faced with a potentially dangerous situation and instinctively grips the steering wheel harder, this causes the vehicle warning system to transmit rf signals to the receiver in the warning unit of the initiating vehicle as well as the receivers in the warning units of other vehicles within a predetermined distance. The transmitted signal causes the warning light to flash and warning sound to be generated from the warning unit in each of the vehicles receiving the transmitted signal.

7 Claims, 3 Drawing Sheets

VEHICLE WARNING SYSTEM

BACKGROUND OF THE INVENTION

This invention relates to a vehicle warning system. More particularly, the invention relates to a vehicle warning system which conveys a warning to the drivers in other vehicles traveling a predetermined distance behind that a potentially dangerous situation may exist.

Most vehicles are equipped with brake lights in the rear windshield to warn drivers immediately behind that the brakes are being applied. However, the traditional brake lights may not provide an adequate warning in a emergency situations. Especially when vehicles are traveling closely together and at high speeds, a driver sensing danger may not react in time, and as a result, steps on his brake with full force at the last moment. By the time the brake lights of the front vehicle illuminate, the driver in the following vehicle often do not have enough time to bring his vehicle to a safe stop and may result in an accident.

In addition, during less than ideal weather conditions such as fog, heavy snow, or rain, the brake lights of the front vehicle may not be visible to the drivers in the following vehicles. Even during an ideal weather condition, the brake lights are only visible to the driver in the vehicle immediately behind, and not visible to the vehicles further back. When traffic comes to a rapid stop, drivers relying only on the brake lights of the vehicle immediately in front, often have insufficient amount of time to apply their brakes and prevent a multiple vehicle collision.

A sufficient amount of warning time is critical in an emergency situation. The sooner a driver can be alerted to danger, the sooner he can take the necessary steps to stop safely. Thus, it is desirable to have a device that can convey warning without requiring the drivers to take their hands off the steering wheel and is independent of the movement of the driver's foot from the accelerator to the brake pedal.

Accordingly, various references uncovered in the prior art provide devices that utilize the steering wheel with switches therein to permit the drivers of the vehicles to control signaling without removing their hands from the steering wheel. For example, U.S. Pat. No. 4,425,560 to Jones discloses an apparatus which is activated by a switching mechanism in the steering wheel for illuminating a distinctive signal located on a rear portion of the motor vehicle to warn the driver of the following vehicle of a potentially hazardous situation.

Jones may provide some utility for illuminating a distinctive signal which embodies the illusion of light converging from a perimeter to an attention point, but is not useful for warning other drivers of a potentially hazardous situation because Jones only solves the problem in a limited way. For instance, the warning lights which Jones employs to warn drivers behind is limited only to the vehicle immediately behind. Chances are the drivers of the vehicles further back cannot see the flashing warning light and cannot apply their brakes in sufficient time to prevent the tailgate type motor vehicle accidents.

Moreover, the switching mechanism employed by Jones is ineffective. The switching mechanism includes a bladder-like member built into the confines of the steering wheel which is filled with fluid. When the bladder-like member is squeezed by the driver's hands, the fluid contained within the bladder-like member is depressed downward which then closes the electrical circuit and energizes the warning signals. The warning signals is intended to illuminate only when the driver is faced with impending danger and instinctively applies more than normal pressure on the steering wheel. However, the warning signal does not work in a consistent and predictable manner, since the amount of pressure necessary to activate the warning signal varies depending on the size of the driver's hands and depending on whether the driver is driving with one hand or with both hands.

While these units mentioned above may be suitable for the particular purpose employed, or for general use, they would not be as suitable for the purposes of the present invention as disclosed hereafter.

SUMMARY OF THE INVENTION

It is an object of the invention to provide a vehicle warning system which is instantaneously initiated when the driver senses danger.

It is another object of the invention to provide a vehicle warning system which is capable of providing warning signals not only to the driver immediately behind but also to the drivers of the vehicles that are too far back to see the rear of the vehicle initiating the warning signals.

It is yet another object of the invention to provide a vehicle warning system which is capable of transmitting rf signals to the receivers in the warning units of the vehicles within a predetermined distance alerting them to prepare to apply their brakes since a potentially dangerous situation may exist.

The invention is a vehicle warning system for vehicles comprising a pressure activated switch disposed within the steering wheel for activating a transmitter when more than normal pressure is applied to the steering wheel. The vehicle warning system further comprises a warning unit which contains a receiver, a sound generator, and a warning lights. When a driver is faced with a potentially dangerous situation and instinctively grips the steering wheel harder, this causes the vehicle warning system to transmit rf signals to the receiver in the warning unit of the initiating vehicle as well as the receivers in the warning units of other vehicles within a predetermined distance. The transmitted signal causes the warning light to flash and warning sound to be generated from the warning unit in each of the vehicles receiving the transmitted signal.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
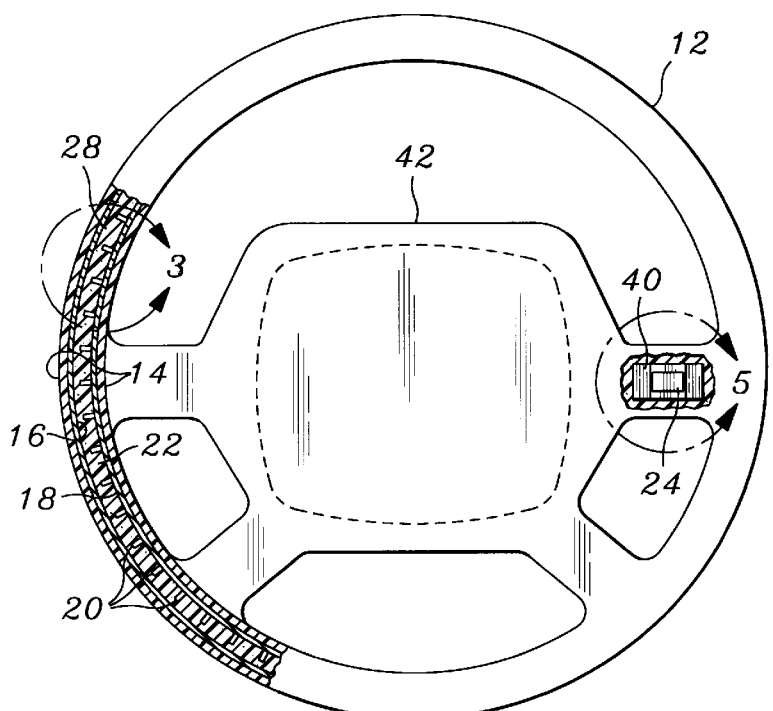
FIG. 1 is a front elevational view, with parts broken away, of the steering wheel incorporating the principles of a preferred embodiment of the instant invention and illustrating the pressure activated switch in the open condition.

Referring to FIG. 1, the vehicle warning system utilizes a steering wheel 12 including an exterior portion 14 constructed of a flexible and resilient material, and an hollow interior portion which has an upper surface and a lower surface. A pressure activated switch 28 is disposed within the hollow interior portion of the steering wheel 12. The pressure activated switch 28 includes a first electric conductor 16 mounted to the upper surface of the interior portion and a second electric conductor 18 mounted to the lower surface of the interior portion. The second electric conductor 18 has a plurality of vertical conductors 20 protruding therefrom.

Figure 3:
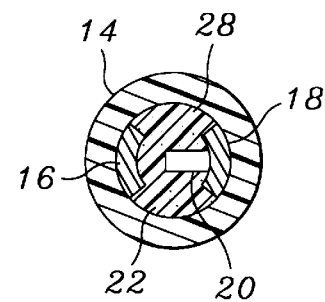
FIG. 3 is a cross-sectional view of the area indicated in circle 3 in FIG. 1, illustrating the pressure activated switch in the open condition.
Figure 4:
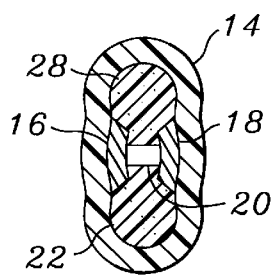
FIG. 4 is a cross-sectional view of the area indicated in circle 2 in FIG. 2, illustrating the pressure activated switch in the closed condition.
Figure 2:
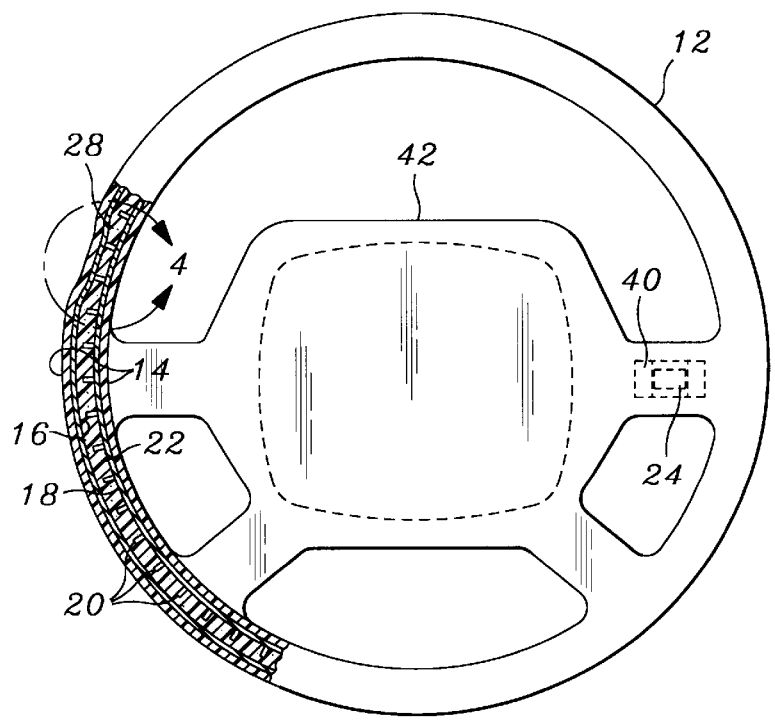
FIG. 2 is a front elevational view, with parts broken away, of the steering wheel incorporating the principles of a preferred embodiment of the instant invention and illustrating the pressure activated switch in the closed condition.

A compressible form core 22 is disposed between the first conductor 16 and the second conductor 18 so that the form core 22 separates the first conductor 16 and second conductor 18 during normal driving condition while the driver is applying normal pressure to the steering wheel 12, as depicted in FIG. 3. However, when the driver exerts a sufficient compressive force on the steering wheel 12, the form core 22 compresses and the first electric conductor 16 makes an electrical connection with the vertical conductors 20 of the second electric conductor 18, thereby electrically closing the pressure activated switch 28, as depicted in FIGS. 2 and 4.

Many other variations of the pressure activated switch are possible. For example, the pressure activated switch 28 mentioned above may be attached to an existing steering wheel of an automobile by utilizing a steering wheel cover. The pressure activated switch 28 can be retained by the steering wheel cover which is sized to wrap around an outside grip surface of a steering wheel. Alternatively, the pressure activated switch 28 can be replaced with a plurality of piezoelectric sensors mounted to a steering wheel that generate a voltage differential or a current dependent upon the degree of pressure applied to the piezoelectric sensor. The piezoelectric sensors are electrically connected in parallel such that the driver need only compress one of the piezoelectric sensor to a predetermined threshold in order to activate the transmitter.

Figure 6:
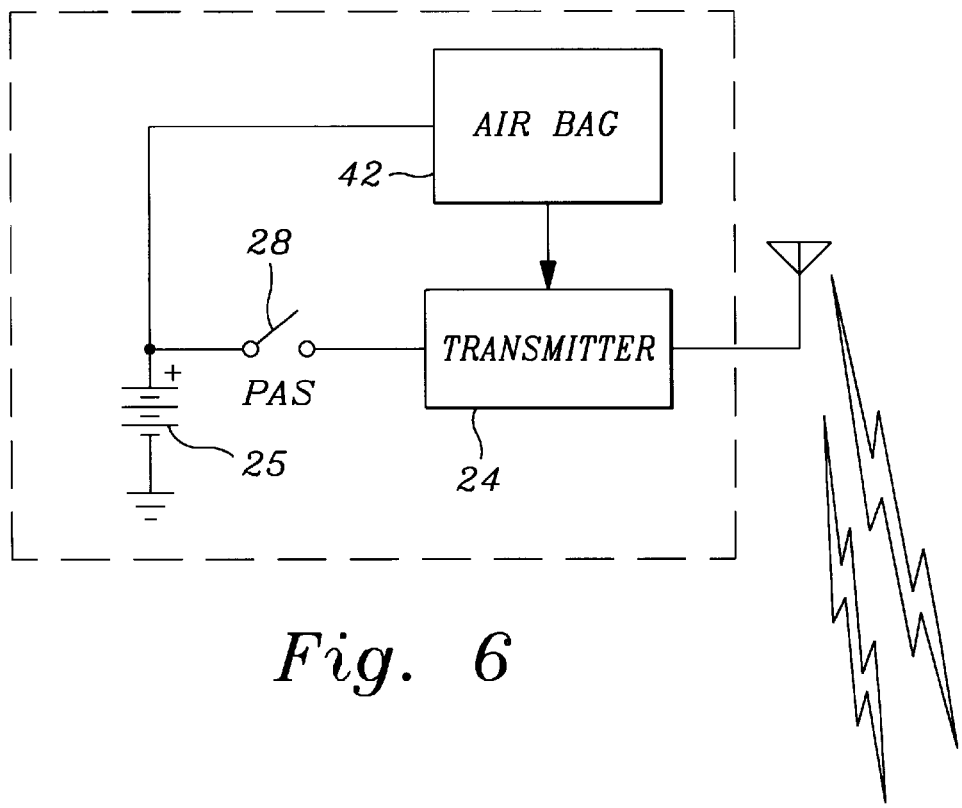
FIG. 6 is a block diagram of the electrical circuitry associated with the steering wheel of FIGS. 1 and 2 in order to operate the instant invention.

FIGS. 1 and 6 illustrate an rf transmitter 24 mounted to the steering wheel 12 and electrically connected to a portable power source or to the vehicle's battery 25, and the pressure activated switch 28 in series whereby the transmitter 24 is energized by the battery 25 under the control of the pressure activated switch 28.

Figure 7:
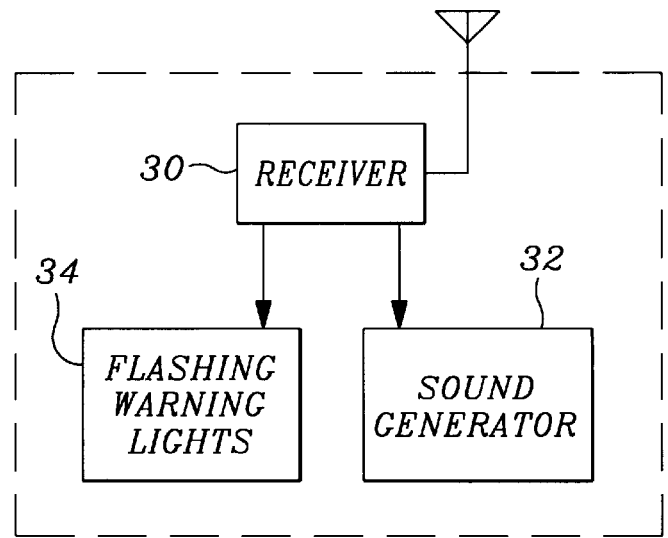
FIG. 7 is a block diagram of the warning unit of the instant invention.
Figure 8:
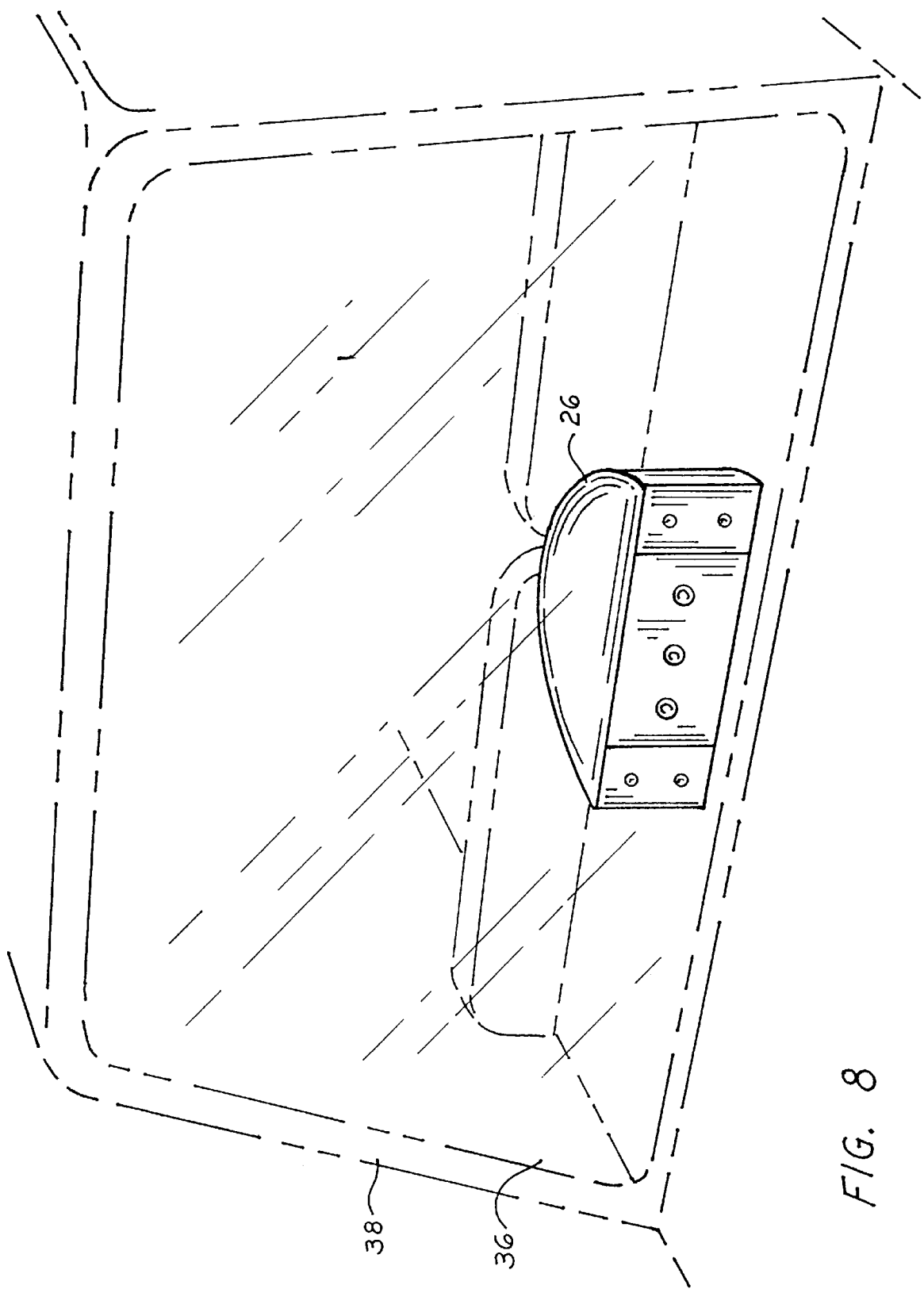
FIG. 8 is a diagrammatic perspective view of the warning unit of the instant invention.

FIG. 8 illustrates the vehicle warning system further comprising a warning unit 26 which attaches to the rear windshield 36 of the vehicle 38. FIG. 7 schematically illustrates the warning unit 26 including an rf receiver 30, a sound generator 32, a light bulb 34, a relay, and a flasher, which are electrically connected to a portable power source or a battery such that upon receiving of the signal by the receiver 30, the light bulb 34 flashes rapidly and the sound generator 32 generates warning sounds. There might be additional electrical circuits necessary to condition the signal prior to application to the sound generator 32. These components are well known to persons of ordinary skill in the art.

In operation, when the driver is faced with a potentially dangerous situation, the driver will instinctively grip the steering wheel 12 harder to brace herself. When more than normal finger pressure is applied to the steering wheel 12, the pressure activated switch 28 closes, as shown in FIG. 2 and 4. Referring to FIGS. 6 and 7, upon closure of the pressure activated switch 28, the transmitter 24 sends an rf signal to the receiver 30 in the warning unit. The rf signal, when received by the receiver 30 in the warning unit, causes the light bulb 34 within the warning unit to flash rapidly and the sound generator 32 in the warning unit to generate warning sound for alerting the passengers in the vehicle of a potential problem.

It has been observed that a majority of drivers grip the steering wheel harder to brace themselves when faced with a potentially dangerous situation and thus the vehicle warning system can be activated without conscious thought. Since the hands are already positioned on the steering wheel 12, no additional body motion, other than the squeezing action of the finger, is required to activate the system. Once the pressure to the steering wheel 12 is reduced, the pressure activated switch 28 will open and the transmitter 24 stops transmitting. When the receiver 30 stop receiving the generated signal from the transmitter 24, the warning lights 34 will cease flashing and the warning sound will stop.

In a preferred embodiment, the vehicle warning system transmits an rf signal not only to the receiver 30 in the warning unit 26 of the initiating vehicle but also to the receivers in the warning units of other vehicles within a predetermined distance. The transmitter 24 may be engineered so as to limit the range of its transmitted signal for a specified radial distance such as 50 to 75 feet. Thus, when a potential problem exists and a driver applies sufficient pressure to the steering wheel 12, the signal will be received by all the receivers in the vehicles in the specified radial distance. The early warning to drivers in all automobiles in the specified radial distance from the initiating vehicle, alerts them to prepare to apply their brakes since a potentially dangerous situation may exist.

The transmitted signal causes the warning light 34 to flash and warning sound 32 to be generated from the warning unit 26 in each of the vehicles receiving the transmitted signal. Once the pressure of the fingers upon the steering wheel 12 returns to a normal level, the pressure activated switch 28 opens and the transmitter 24 ceases sending its signal. After the transmitted signal ceases, the warning unit 26 stops flashing and the warning sound ceases sounding in the initial vehicle and all other vehicles which were previously activated. It is the combination of the rapidly flashing light and warning sound which alerts both the drivers of other vehicles as well as any passenger therein which makes our invention unique and capable of helping to reduce both multiple accidents and most importantly, loss of life resulting therefrom.

Figure 5:
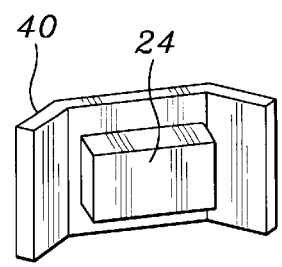
FIG. 5 is an enlarged perspective view of the area indicated in circle 5 in FIG. 1.

FIGS. 1 and 5 illustrate a shield 40 mounted in the steering wheel 12 for obstructing the rf signal transmitted by the transmitter 24 from traveling forward and lateral. The shield 40 is made of a material that is capable of blocking rf signals such as a lead or other high density material. The transmitter 24 and the shield 40 is situated to allow the rf signal to be transmitted in a rearward and obliquely lateral direction to avoid the receivers in vehicles forward and immediately lateral from receiving such signal. Otherwise, the signal could be received by receivers in vehicles traveling in an opposing traffic lane, thereby unnecessarily disrupting the normal flow of traffic.

Referring to FIGS. 2, 3 and 6, a second circuit is mounted in the steering wheel 12 and is connected to the air bag 42 and the transmitter 24 such that when any compartment housing the air bag 42 opens, the transmitter 24 sends a second signal. Normally, the air bag 42 opens as a result of an accident and under such a circumstances, a closed circuit is formed as the air bag 42 opens and the battery sends an electric charge to the transmitter. When the second circuit is activated, the receiver 30 in the warning unit recognizes the second signal and immediately causes the warning light 34 to begin to flash in the vehicle involved in the accident as well as those within the prescribed rearward and obliquely lateral vehicles which are within the range of the transmitted signal.

The result of the second circuit being activated is exactly the same as that when the pressure activated switch 28 is activated with the exception that instead of a warning sound being generated, a voice chip is activated which repeats a message such as "An accident has occurred . . . Proceed with caution." Thus, when vehicles approach the accident site and come within the range of the transmitted signal, their warning unit begin to flash and the audible message is sounded. When the vehicle passes the site of the accident and travels beyond the range of the signal, both the flashing warning light and the sound are automatically turned off. The signal generated and transmitted by the second circuit of the transmitter in the vehicle involved in the accident will continue until it is manually switched off by the police or towing service operator.

Many specific details contained in the above description merely illustrate some preferred embodiments and should not be construed as a limitation on the scope of the invention.

What is claimed is:

1. A vehicle warning system for alerting drivers in other vehicles traveling a predetermined distance behind an initiating vehicle that said initiating vehicle may be experiencing a potentially dangerous situation, said vehicle warning system comprising:

a) a pressure activated switch means disposed about a steering wheel of said initiating vehicle, said pressure activated switch means electrically closes when more than a predetermined compressional pressure is applied to the steering wheel;

b) a transmitter means connected to said pressure activated switch means such that when the pressure activated switch electrically closes said transmitter means transmits radio frequency signals a predetermined distance behind the initiating vehicle;

c) a warning unit to be attached said initiating vehicle and to other vehicles, each of said warning unit including a receiver for receiving signals transmitted by said transmitter, a warning means connected to said receiver such that upon receiving of the signal transmitted by the transmitter the warning means is activated to provide early warning to a driver in a trailing vehicle that one of the leading vehicles may be experiencing a potentially dangerous situation; and d) wherein whenever the pressure activated switch means closes, the transmitter means sends signals to the receiver in the warning unit of the initiating vehicle and to the receivers in the warning units of other vehicles traveling a predetermined distance behind.

2. The vehicle warning system of claim 1, wherein the warning unit is attached adjacent to a rear windshield of a vehicle, wherein the warning means comprises at least one illumination means connected to the receiver such that the illumination means activates upon receiving of the signals transmitted by the transmitter.

3. The vehicle warning system of claim 2, wherein the warning means further comprises a sound generator connected to the receiver such that said sound generator generates a warning sound upon receiving of the signals transmitted by the transmitter to alert a driver and passengers in a vehicle generating the warning sound to prepare for a potentially dangerous situation.

4. The vehicle warning system of claim 3, further comprising a shield mounted in the steering wheel for obstructing the signal transmitted by the transmitter from traveling forward and laterally.

5. The vehicle warning system of claim 4, wherein the vehicle has an air bag, said vehicle warning system further comprising a second circuit means mounted in the steering wheel and connected to the air bag and the transmitter such that when the air bag opens, the transmitter sends a signal.

6. The vehicle warning system of claim 5, wherein the steering wheel includes an exterior portion constructed of a flexible and resilient material and includes an interior port having an upper surface and a lower surface, and wherein the pressure activated switch means comprises:

a) a first electric conductor mounted to the upper surface of the interior portion;

b) a second electric conductor having a plurality of vertical conductors protruding therefrom mounted to the lower surface of the interior portion; and c) a compressible form core disposed between the first conductor and the second conductor.

7. The vehicle warning system of claim 5, wherein the pressure activated switch means comprises a plurality of piezoelectric switches mounted about the steering wheel.

\* \* \* \* \*